Aug. 7, 1962     E. E. RUSH     3,048,009
ROCKET MOTOR
Filed June 21, 1956     3 Sheets-Sheet 1
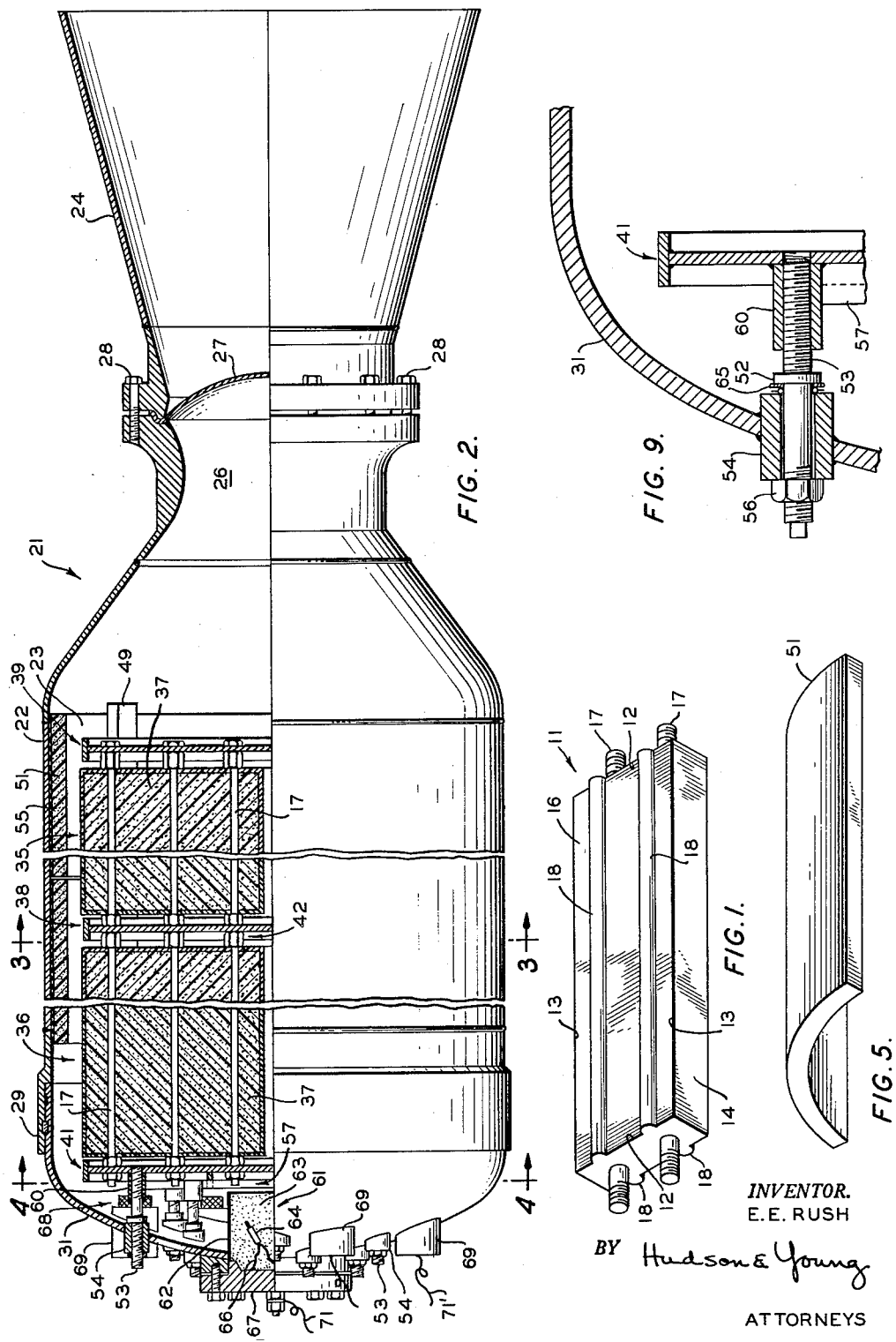
INVENTOR.
E. E. RUSH
BY Hudson & Young
ATTORNEYS Aug. 7, 1962  E. E. RUSH  3,048,009
ROCKET MOTOR
Filed June 21, 1956  3 Sheets-Sheet 2
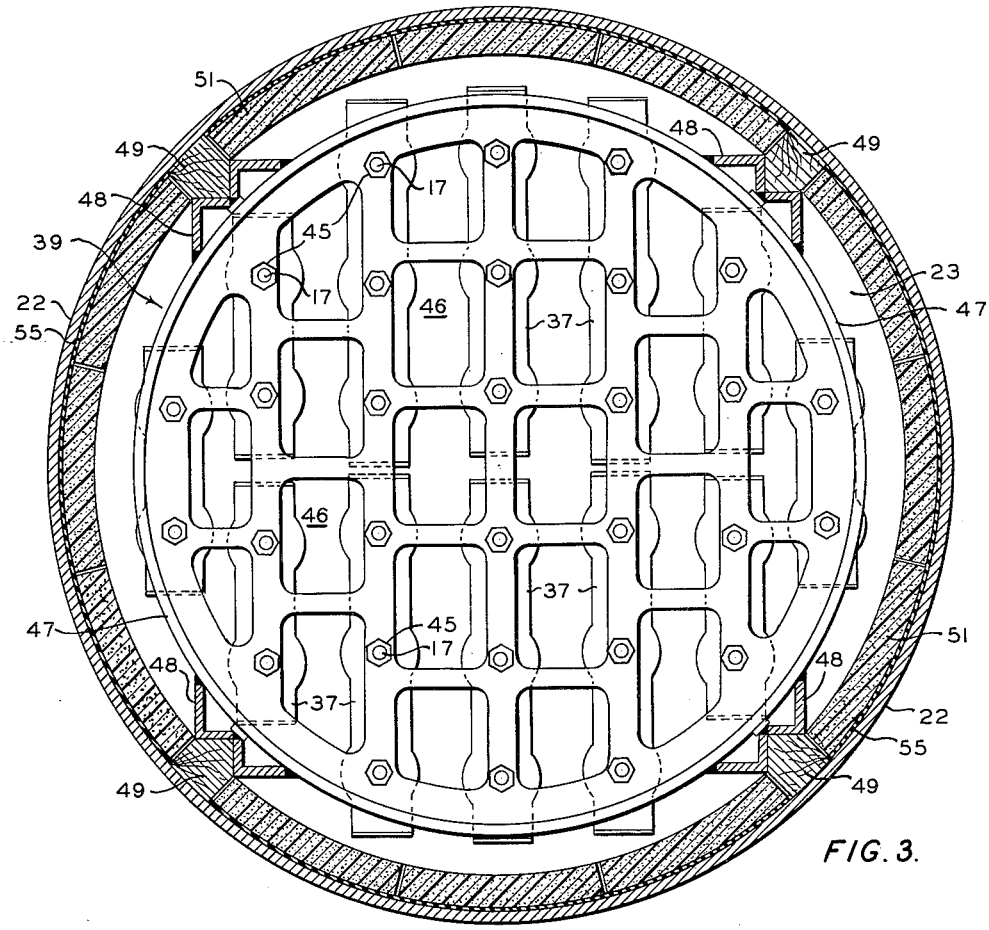
FIG. 3.
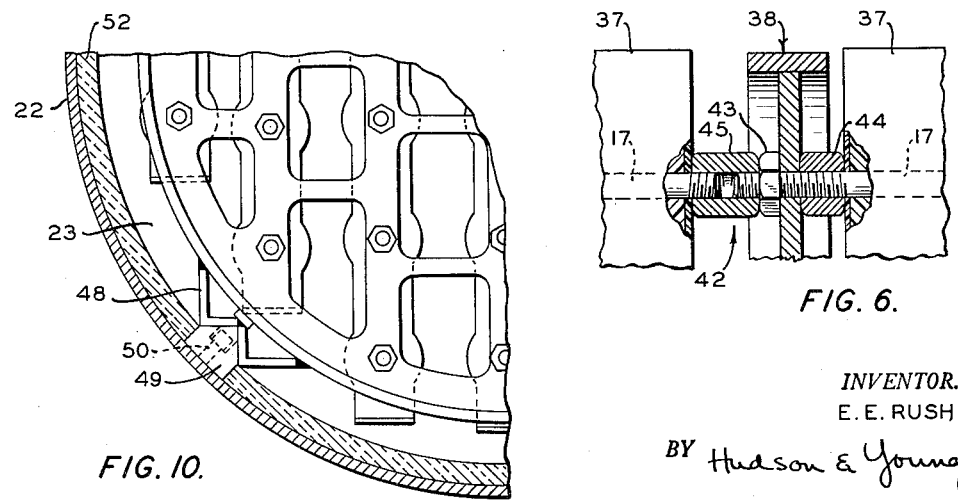
FIG. 10.
FIG. 6.
INVENTOR.
E. E. RUSH
BY Hudson & Young
ATTORNEYS Aug. 7, 1962     E. E. RUSH     3,048,009
ROCKET MOTOR
Filed June 21, 1956     3 Sheets-Sheet 3
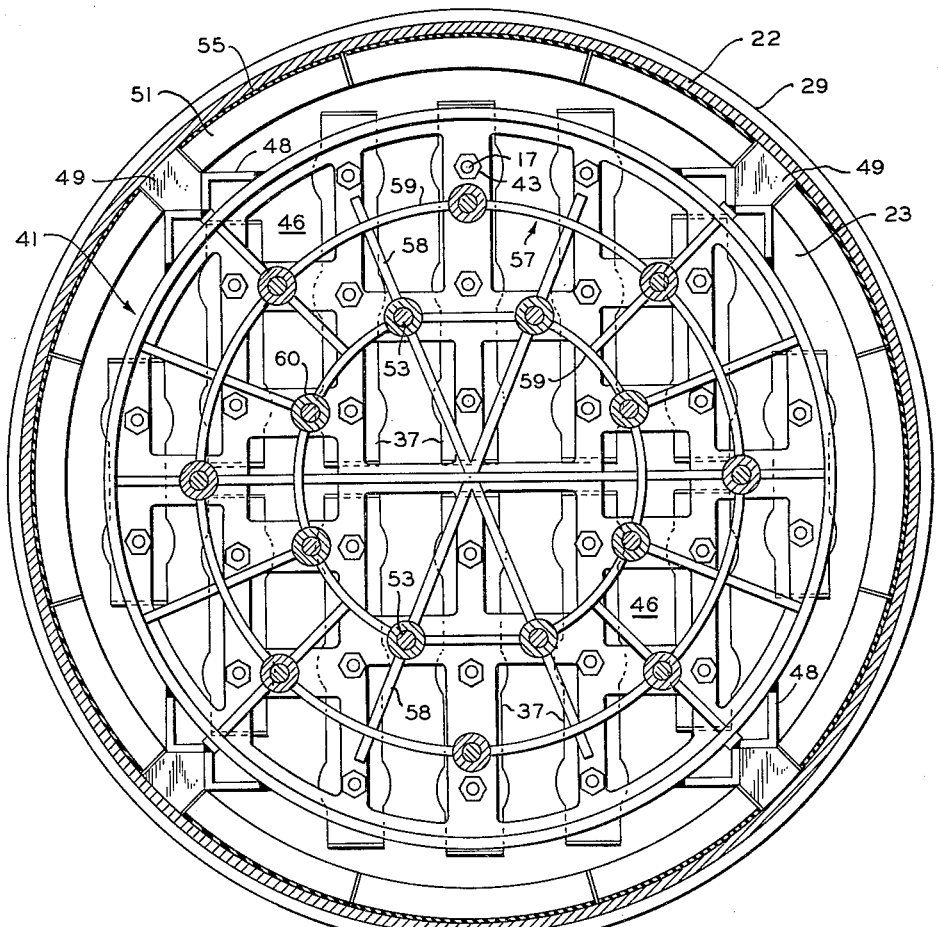
FIG. 4.
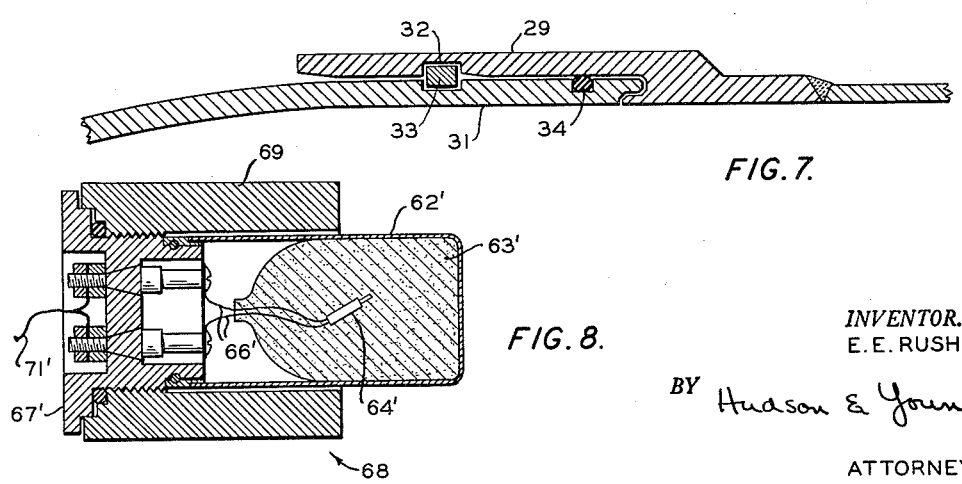
FIG. 7.
FIG. 8.
INVENTOR.
E. E. RUSH
BY Hudson & Young
ATTORNEYS

United States Patent Office 3,048,009
Patented Aug. 7, 1962

3,048,009
ROCKET MOTOR
Elton E. Rush, McGregor, Tex., assignor to Phillips Petroleum Company, a corporation of Delaware
Filed June 21, 1956, Ser. No. 592,989
9 Claims. (Cl. 60—35.6)

This invention relates to a rocket motor containing solid propellant material. In one aspect, it relates to improved means for suspending and supporting solid, restricted rocket grains of propellant material. In another aspect, it relates to large rocket motors, especially the booster type, the combustion chamber of which contains a thin-webbed, multi-grain propellant configuration and a solid propellant lining.

In the employing of rockets it is important that the means for supporting and arranging the propellant charge in the rocket motor combustion chamber be ruggedly constructed so as to withstand the inertial and vibrational forces encountered during the short duration and rapid acceleration of the rocket, especially when thin-webbed, multi-grain propellant configurations are employed. The trapping means for supporting and spacially arranging the individual rocket grains of the propellant charge must preserve the correct axial alignment of the grains throughout the combustion of the same. The trapping means must also be so designed that the severe lateral accelerations often experienced during operation will not hinder the desired trajectory.

In the main, the prior art means for supporting and arranging multi-grain propellant charges are concerned with small, light-weight propellant grains. Double web, booster-type rocket grains such as the propellant grains disclosed and claimed in the U.S. application of B. R. Adelman, Serial No. 453,772, filed September 2, 1954, now Patent No. 2,939,396, have recently been developed for use in multi-grain propellant charges. Large, heavy rocket grains of the booster-type present scale-up problems of assembly not found in the prior art. Support of these grains in the canisters, sleeves, and like prior art means would be impractical because sufficient burning surface area would not be available. Self-supporting means proposed in the prior art would likewise be impractical because of the great inertia of the heavy booster-type grains and the immense thrust (e.g., 130,000 or 250,000 pounds) developed by booster rocket motors.

Because booster-type rocket motors must reach great velocities in extremely short periods, with a consequent sudden increase in inertial load upon the propellant charge, it is essential that the trapping means employed securely retain the propellant grains in fixed position during operation. Since multi-grain propellant charges of the booster-type may weigh as much as 6,000 lbs. or more and comprise a plurality (e.g., 100) of individual rocket grains weighing 60 lbs., for example, the design criteria for the trapping means becomes very important and it is essential that the multi-grain propellant charge acts for all intents and purposes as a single grain.

Moreover, the trapping means must be so designed that the forces tending to pull the propellant material from the trapping members during operation will be of insufficient magnitude to cause a loss of propellant material, a phenomenon which occurs when a portion of unburned propellant material breaks off from the grain proper and escapes through the exhaust nozzle causing a sharp drop in pressure due to the suddent decrease in burning surface area. These unburned fragments of propellant material may even become lodged on the support grid in the rocket motor combustion chamber with a consequent sharp rise in pressure due to the sudden increase in burning surface area. Thus, there has arisen a need for means of positively supporting and arranging the heavy multi-grain propellant charge in the rocket motor.

Though the trapping means utilized for supporting and arranging multi-grain propellant charges must be ruggedly constructed, it should be light-weight, it should not affect the desired uniform density of the propellant mass nor should it obstruct the free and normal flow of combustion gases out through the exhaust nozzle. Furthermore, such trapping means must be capable of supporting the individual propellant grains in a position such that the great inertial forces acting on the grains will be in the direction that will minimize as much as possible the strains on the grains.

An object of this invention is to provide a rocket motor utilizing large, heavy booster-type rocket grains positively supported in the combustion chamber of the rocket motor.

Another object is to provide a rocket motor, the combustion chamber of which is loaded with a thin-webbed, multi-grain propellant configuration and a solid propellent lining.

Another object is to provide a rocket motor having a multi-grain propellant charge configuration positively supported therein by novel means characterized by light-weight, simplicity, and positive action.

Another object is to provide a rocket motor having a multi-grain propellant charge maintained in a fixed position in the combustion chamber of the rocket motor during severe conditions of acceleration and vibration encountered during the operation or handling of the rocket motor.

Another object is to provide a rocket motor having a multi-grain propellant charge so secured in the combustion chamber of the rocket motor that the forces tending to pull the propellant material from the rocket grain supports during operation will be of insufficient magnitude to cause disintegration of the grain.

Other objects and advantages of my invention will become apparent to those skilled in the art from the following description, accompanying claims, and drawings in which:

FIGURE 1 is an isometric view of a solid, restricted rocket grain of the double-web type;

FIGURE 2 is an elevational view of a rocket motor in quarter-section illustrating my invention;

FIGURES 3 and 4 are elevational cross-sectional views of the rocket motor of FIGURE 2 taken along the planes indicated;

FIGURE 5 is an isometric view of a solid, unrestricted rocket grain;

FIGURE 6 is an enlarged partial cross-sectional view of the rod coupling means shown in FIGURE 2;

FIGURE 7 is an enlarged, cross-sectional view of a portion of the rocket motor of FIGURE 2 illustrating in detail the connection between the rocket head and rocket casing;

FIGURE 8 is an enlarged cross-sectional view of the auxiliary igniters shown in FIGURE 2;

FIGURE 9 is an enlarged cross-sectional view illustrating in detail the manner in which the head support plate of FIGURE 2 is connected to the rocket head; and, FIGURE 10 is an elevational cross-sectional view of a portion of a rocket motor similar to FIGURE 2 illustrating a further embodiment of my invention.

Referring to the drawing now in detail, and to FIGURE 1 in particular, there is shown a restricted rocket grain 11 which is similar in some respects to that disclosed and claimed in the aforementioned Adelman application. The rocket grain 11 has a rectangular parallelepiped configuration and may have ends 12 and sides 13 covered by burning-restricting material 14 while its upper surface 16 and lower surface (not shown) are exposed or unrestricted to permit burning of the propellant material. Rocket grain 11 is shown with longitudinal internal support members or rods 17 (preferably made of metal) which protrude from the ends of the grain. The exposed or unrestricted upper surface 16 and lower surface are provided with ribs 18 which are likewise unrestricted and form part of said upper and lower surfaces. The ribs permit a thickness of propellant web around the rods equal to the thickness of web in the remaining portions of the grain. This type of grain 11 can be referred to as having a double-web configuration in that burning of the propellant material proceeds on two oppositely disposed burning surfaces, that portion of the propellant which is consumed by the combustion taking place on one surface being one web and the other half portion of the propellant material being consumed as a result of the combustion on the other exposed surface being the other web.

In FIGURE 2, a rocket motor generally designated as 21 is shown having a shell or cylindrical casing 22 defining in part a combustion chamber 23. The rear or aft end of the casing 22 is tapered and connected to a nozzle portion 24; these members are so constructed as to define a venturi-like passage 26 for the exhaust of combustion gases from combustion chamber 23. Alternatively, the nozzle portion may be made integral with the rocket motor casing 22 in place of the separate nozzle portion shown. A blow-out or rupture disk 27 is positioned across the passage 26 and is secured at its periphery between the nozzle portion 24 and the tapered portion of the casing 22 by means of bolts 28. The fore or head portion of the casing 22 is constructed in the form of an axial flange 29 and is secured to the head or closure member 31 of the rocket motor, as shown more clearly in FIGURE 7. Contacting portions of closure member 31 and casing flange 29 are provided with a recess 32 in which is positioned a closure key 33 which is inserted through ports in flange 29, and which is preferably sectionalized. The contacting portions of closure member 31 and flange 29 are also preferably provided with an O-ring seal 34.

The combustion chamber 23 of rocket motor 21 is loaded with a plurality of propellant charge units 35, 36. Each of the charge units 35, 36 comprises a plurality of double-web, restricted rocket grains 37, such as the type shown in FIGURE 1. The grains 37 are parallel spaced from one another and in longitudinal alignment with rocket motor 21. The axially aligned rods of adjacent charge units 35, 36 are connected together by self-aligning coupling members 42, shown more clearly in FIGURE 6. The forwardly protruding threaded ends of the support rods 17 of charge unit 35 pass through openings in intermediate support plate 38 and are secured on either side thereof by means of jam nut 43 and nut 44. The rearwardly extending ends of the support rods 17 of charge unit 36 are connected to the forwardly extending rods 17 of charge unit 35 by means of a turn buckle 45. The rearwardly extending threaded ends of rods 17 of the charge unit 35 adjacent the nozzle passage 26 pass through the aft support plate 39 and are secured thereto by nuts 43, 44 on either side thereof. The forwardly extending ends of rods 17 of the charge unit 36 adjacent the closure member 31 pass through openings in head support plate 41 and are secured thereto by nuts 43, 44 on either side thereof.

The support plates 38, 39, and 41 and the manner in which the rods 17 of the several charge units 35, 36 are arranged and secured thereto are shown more clearly in FIGURES 3 and 4. The support plates 38, 39, and 41 have ports 46 for the passage of combustion gases. The peripheries of the support plates 38, 39 and 41 are each constructed in the form of a flange 47. Plates 38 and 39 are provided with a plurality of radially extending ears 48 which may be secured to the flange 47 by welding, riveting or the like. The inner wall of the rocket motor casing 22 has secured thereto an equal number of rails or tracks 49, preferably made of hard wood or other slow or non-burning material, which are secured to the casing 22 by countersunk studs 50, as shown in detail in FIGURE 10. The ears 48 are adapted to articulate with rails 49 and in this manner each charge unit 35, 36 can be slidably inserted and loaded into the combustion chamber 23 through the head end of the rocket motor 21 and moved to its proper position.

The inner wall of the rocket motor casing 22 is lined with a single layer of propellant material comprising a plurality of grains 51, such as shown in FIGURE 5. These grains 51 (diverging concave-convex in cross-section) are unrestricted on the inner face and are bonded to the casing 22 at their outer surfaces and to each other at their sides by means of propellant "mortar" 55 (FIGURE 3). Rails 49 project into the combustion chamber 23 through the composite propellant lining and grains 51 contiguous with the rails are also bonded thereto by the propellant mortar. Although I prefer to employ this propellant lining in the preferred embodiment of my invention, it is within the scope of my invention to merely coat the inside wall of the casing 22 with suitable insulation material 52, as shown in FIGURE 10. The provision of the propellant lining is advantageous in that it permits latitude in charge configuration and more leeway in achieving the necessary propellant density and the necessary ratio of free exhaust passage area to throat area.

The head support plate 41 adjacent the closure member 31 is secured to a plurality of circumferentially-spaced head bolts 53 which pass through packing glands 54 in closure member 31 and are secured by nut 56, as shown more clearly in FIGURE 9. Gas seal is formed by gasket 65 between shoulder 52 on bolt 53 and gland 54. Head support plate 41 is provided with a spider generally designated 57 on that side adjacent the closure member 31. Spider 57 comprises diagonal rods 58 and rings 59. Head bolts 53 threadedly engage bosses 60 which are in turn secured to head support plate 41 by welding or the like. Alternatively, the forwardly extending rods 17 of the charge unit 36 can be secured directly to the closure member 31 (after passing through the head support plate 41) by the manner in which head bolts 53 are secured to closure member 31.

Referring to FIGURE 2 again, the closure member 31 is provided with a centrally positioned primary igniter assembly 61 comprising a cup or similarly shaped member 62 which extends into the combustion chamber 23 adjacent support plate 41. Cup 62 is filled with igniter material 63, such as black powder, in which is placed a squib or match 64 attached to suitable electrical leads 66 which are electrically connected to the igniter cap 67. The closure member 31 is also provided with a plurality of auxiliary igniters 68 shown in detail in FIGURE 8 with parts similar to those of primary igniter assembly 61 designated with primed reference numerals. The auxiliary igniters 68 extend into the combustion chamber 23 through bosses 69 in the closure member 31, and are so positioned as to readily ignite all burning surfaces of the propellant charge units 35, 36 and the composite propellant lining. The main igniter 61 and the auxiliary igniters 68 are provided with suitable electrical leads 71 which lead to a power source external to the rocket motor 21.

The individual restricted rocket grains are assembled into a charge unit between the two support plates on either end thereof and the whole inserted into the head end of the rocket motor by sliding the support plate ears on the tracks. The first charge unit, i.e., that charge unit to be positioned adjacent the nozzle passage, when inserted into the combustion chamber is not moved immediately into its final position but rather the rear portion of the unit is allowed to extend out from the head end of the rocket motor to enable the second or intermediate charge unit to be aligned therewith to permit the protruding ends of the rocket support rods of the adjacent charge unit to be connected by means of the turnbuckle. After this connection is made, the first and second charge units are slidably moved further into the combustion chamber, allowing the rear portion of the second charge unit to extend out from the head end of the rocket motor as before to allow another charge unit to be similarly aligned and connected. In this manner a plurality of charge units are loaded into the combustion chamber in a tandem arrangement. The head bolts connected to the head support plate of the finally loaded charge unit, i.e., that charge unit to be positioned adjacent the head of the rocket motor, extend through the packing glands in the closure member and are secured thereto be nuts, for example as shown in the drawing. In that embodiment of my invention where the propellant lining is employed, the charge units are loaded into the rocket motor after the lining is bonded to the rocket motor casing.

It will be apparent that the foregoing loading procedure may be varied and I do not intend to limit my invention to the procedure illustrated. The individual rocket grains may be formed to exact dimensions in automatic machinery and loaded by unskilled labor without affecting the uniformity or rigid construction of the charge units. Moreover, the invention is not limited to the specific loading arrangement illustrated. Other arrangements may be employed, according to my invention, to utilize to advantage the space in the rocket motor.

Although my invention finds particular utility in the spatial arrangement and support of double-web type grains, such as disclosed and claimed in the aforementioned Adelman application, it is to be understood that my invention is not necessarily limited thereto but rather may be employed for spacially arranging and positively supporting any large, heavy, booster-type rocket grains in multi-grain propellant charge units where stresses built up during acceleration are of a great magnitude.

In reducing my invention to practice by conducting test firings of a specific embodiment of the rocket motors herein described, the efficacy of the novel means I employ to suspend and support the rocket grains has been demonstrated and the objects of my invention achieved. The rocket grains were supported to burn-out instant and the tensile loads and vibration encountered were effectively transmitted to the head and casing of the rocket motor without necessitating the use of heavy or complex hardware to achieve the same, without the loss of propellant material by disintegration of the grains, and without sacrificing the volume of available combustion space or control over the burning area of the propellant material.

The propellant material utilized in fabricating the rocket grains of this invention can be prepared from a variety of known compounding materials. Particularly useful propellant compositions which may be utilized in the practice of this invention are of the rubbery composite type which are plasticized and worked to prepare an extrudable mass at 130° to 175° F. The copolymer can be reinforced with suitable reinforcing agents such as carbon black, silica, and the like. Suitable oxidation inhibitors, wetting agents, modifiers, vulcanizing agents, and accelerators can be added to aid processing and to provide for the curing of the extruded propellant grains at temperatures preferably in the range of 170°–185° F. In addition to the copolymer binder and other ingredients, the propellant composition comprises an oxidizer and a burning rate catalyst. The resulting mixture is heated to effect curing of the same.

Solid propellant compositions particularly useful in the preparation of the propellants used in this invention are prepared by mixing the copolymer with a solid oxidizer, a burning rate catalyst, and various other compounding ingredients so that the reinforced binder forms a continuous phase and the oxidizer a discontinuous phase. The resulting mixture is heated to effect curing of the same.

The copolymers are preferably formed by copolymerization of a vinyl heterocyclic nitrogen compound with an open chain conjugated diene. The conjugated dienes employed are those containing 4 to 6 carbon atoms per molecule and representatively include 1,3-butadiene, isoprene, 2,3-dimethyl-1,3-butadiene, and the like. The vinyl heterocyclic nitrogen compound generally preferred is a monovinylpyridine or alkyl-substituted monovinylpyridine such as 2-vinylpyridine, 3-vinylpyridine, 4-vinylpyridine, 2-methyl-5-vinylpyridine, 5-ethyl-2-vinylpyridine, 2,4-dimethyl-6-vinylpyridine, and the like. The corresponding compounds in which an alpha-methylvinyl (isopropenyl) group replaces the vinyl group are also applicable.

In the preparation of the copolymers, the amount of conjugated diene employed is in the range between 75 and 95 parts by weight per 100 parts monomers and the vinyl heterocyclic nitrogen is in the range between 25 and 5 parts. Terpolymers are applicable as well as copolymers and in the preparation of the former up to 50 weight percent of the conjugated diene can be replaced with another polymerizable compound such as styrene, acrylonitrile, and the like. Instead of employing a single conjugated diene compound, a mixture of conjugated dienes can be employed. The preferred, readily available binder employed is a copolymer prepared from 90 parts by weight of butadiene and 10 parts by weight of 2-methyl-5-vinylpyridine, hereinafter abbreviated Bd/MVP. This copolymer is polymerized to a Mooney (ML–4) plasticity value in the range of 10–40, preferably in the range of 15 to 25, and may be masterbatched with 5–20 parts of Philblack A, a furnace black, per 100 parts of rubber. Masterbatching refers to the method of adding carbon black to the latex before coagulation and coagulating to form a high degree of dispersion of the carbon black in the rubber. In order to facilitate dispersion of the carbon black in the latex Marasperse–CB, or similar surface active agent, is added to the carbon black slurry or to the water used to prepare the slurry.

The following empirical formulation or recipe generally represents the class of propellant compositions preferred for the preparation of the propellant grains of this invention.

*Table I*

| Ingredient | Parts per 100 parts of rubber | Parts by Weight |
|---|---|---|
| Binder | | 10-25 |
|   Copolymer (Bd/MVP) | 100 | |
|   Philblack A (a furnace black) | 10-30 | |
|   Plasticizer | 10-30 | |
|   Silica | 0-20 | |
|   Metal oxide | 0-5 | |
|   Antioxidant | 0.5 | |
|   Wetting agent | 0-2 | |
|   Accelerator | 0.2 | |
|   Sulfur | 0.2 | |
| Oxidizer (Ammonium nitrate) | | 75-90 |
| Burning rate catalyst | | 0-30 |

Suitable plasticizers useful in preparing these propellant grains include TP–90–B [Di-(butoxy ethoxy ethoxy) methane] supplied by Thiokol Corp.; benzophenone; and Pentaryl A (monoamylbiphenyl). Suitable silica preparations include a 10–20 micron size range supplied by Davison Chem. Co.; and Hi-Sil 202, a rubber grade material supplied by Columbia-Southern Chem. Corp. A suitable anti-oxidant is Flexamine, a physical mixture containing 25 percent of a complex diarylamine-ketone reaction product and 35 percent of N,N'-diphenyl-p-phenylenediamine, supplied by Naugatuck Chem. Corp. A suitable wetting agent is Aerosol–OT (dioctyl sodium sulfosuccinate), supplied by American Cyanamid Co. Satisfactory rubber cure accelerators include Philcure 113 (SA–113 N,N-dimethyl-S-tertiary butylsulfenyl dithiocarbamate); Butyl–8 (a dithiocarbamate-type rubber accelerator), supplied by R. T. Vanderbilt Co.; and GMF (quinone dioxime), supplied by Naugatuck Chem. Co. Suitable metal oxides include zinc oxide, magnesium oxide, iron oxide, chromium oxide, or combinations of these metal oxides. Suitable burning rate catalysts include ferrocyanides sold under various trade names such as Prussian blue, steel blue, bronze blue, Milori blue, Turnbull's blue, Chinese blue, new blue, Antwerp blue, mineral blue, Paris blue, Berlin blue, Erlanger blue, foxglove blue, Hamburg blue, laundry blue, washing blue, Williamson blue, and the like. Other burning rate catalysts such as ammonium dichromate, potassium dichromate, sodium dichromate, ammonium molybdate, and the like, can also be used.

The propellant mortar utilized for bonding the individual rocket grains to the rocket motor casing and to each other should preferably have a burning rate which is approximately the same as the average burning rate of the composite propellant lining. The mortar can comprise a compatible rubbery binder preferably liquid in its uncured state and having incorporated therein a low oxidizer content. The usual rubber base cements are not particularly applicable since their burning rates are so slow that for all intents and purposes they are incombustible and they do not possess the desirable resiliency. A series of particularly useful polysulfide liquid polymer formulations which can be employed in the propellant mortar of the present invention are those such as LP–2, LP–3 and LP–8, prepared by the Thiokol Corp. When these polymers have incorporated therein ammonium perchlorate, which contains a higher percentage of oxygen than ammonium nitrate, low oxidizer loadings must be utilized to limit burning rate to the desirable range of 0.1 to 0.2 inch/sec. These formulations are characterized by their high resiliency due to the nature of the binder and to their relatively low oxidizer content, thereby when rocket grains are bonded with mortar made from these formulations they are less susceptible to the effects of shock and temperature induced forces. Suitable propellant mortar formulations for the preparation of resilient mortars having burning rates in the range of 0.1 to 0.2 inch per second are:

Table II

| Ingredient: | Weight percent |
| --- | --- |
| Ammonium perchlorate | 40–60 |
| LP–3[1] | 35–55 |
| p-Quinone dioxime | 0–5 |
| Diphenyl guanidine | 0–3 |

[1] A liquid polymer prepared by the Thiokol Corp.

The layer of burning-restricting material can be made from any of the slow-burning materials used for this purpose in the rocket art, such as cellulose acetate, ethyl cellulose, butadiene-methylvinylpyridine copolyer, GRS, and the like.

The igniter material used for the primary and auxiliary igniters of this invention can be black powder or other pyrotechnic material commonly used in the rocket art for this purpose.

Variations and modifications of my invention may be made by those skilled in the art without departing from the scope or spirit thereof, and it is to be understood that all matter herein set forth in the discussion and drawings is merely illustrative and does not unduly limit my invention.

I claim:

1. A rocket motor comprising a generally cylindrical casing having a central longitudinal axis, said casing defining a cylindrical combustion chamber having a rearwardly disposed axial opening and a forward end closed by a head closure member, a nozzle member coaxially aligned with said axial opening and defining a constricted axial exhaust passage, a propellant charge suspended within said chamber and comprising a plurality of charge units of substantially the same propellant mass arranged in a tandem manner and coaxial with said chamber, each of said charge units in turn comprising a plurality of propellant grains disposed in axially spaced relationship with one another and said casing, each of said grains fabricated from composite type propellant, each grain being parallelpiped in configuration and having two oppositely disposed exposed burning surfaces of the double-web type, each of said grains having at least one support rod passing therethrough with protruding ends, stationary perforate support plates defining each end of said charge unit, said support rod ends secured to said plates, the latter lying in a plane perpendicular to said longitudinal axis and being of a smaller diametrical dimension than said chamber, a plurality of charge unit support rails secured to the inner wall of said casing and substantially extending the length of said chamber, means attached to the peripheries of said plates and adapted to articulate with said support rails whereby each of said charge units can be slidably loaded into said chamber, said support rails and said last-mentioned means adapted so as to transmit lateral forces operating upon said charge units during flight of said rocket motor directly to said casing, coupling means connecting the adjacent ends of axially aligned support rods of adjacent charge units, tension members connecting one of said support plates adjacent said head closure member to the latter whereby inertia forces operating upon said charge are directed to said casing, and ignition means disposed in said chamber to ignite said propellant grains upon their said exposed surfaces.

2. The rocket motor according to claim 1 further comprising a lining of propellant material of the composite type bonded to the inside wall of said chamber by propellant mortar, the inner surface of said lining being exposed and the inner diametrical dimension of which is larger than said diametrical dimension of said plates whereby an annular passage exists therebetween, said charge unit support rails protruding from said inner surface of said lining.

3. The rocket motor according to claim 1 wherein said propellant grains have a markedly short burning time and are especially adapted for booster service, said grains further characterized by being restricted on their ends and two sides and being unrestricted on those sides facing adjacent grains, said grains having at least one centrally-disposed, longitudinally-extending perforation for said support rod member, said unrestricted sides having an outwardly-protruding, longitudinally extending rib in alignment with said perforation.

4. The rocket motor according to claim 1 wherein the rearwardly protruding ends of said support rods pass through openings in the corresponding adjacent said support plate and are secured thereto by nuts on either side thereof, the forward protruding ends of said support rods of that charge unit adjacent said axial opening secured to a corresponding said support plate in a similar manner, said coupling member comprising a turnbuckle.

5. The rocket motor according to claim 1 wherein said tension members comprise a plurality of circumferentially-spaced bolts which extend through packing glands in said head closure member and are secured thereto by nuts on either side thereof, said bolts adapted to undergo only tensional stresses when said rocket motor is operated on by inertia forces.

6. The rocket motor according to claim 1 wherein said ignition means comprises a primary igniter centrally secured to the inside of said head closure member and a plurality of auxiliary igniters circumferentially-spaced and similarly attached to said head closure member.

7. The rocket motor according to claim 1 wherein said nozzle member is detachably secured to the rear end of said casing by an annularly mounted flange registering with and bolted to a similar flange on said casing, said constricted axial exhaust passage having a blowout sealing disc extending across the same.

8. A rocket motor comprising a generally cylindrical casing having a central longitudinal axis, said casing defining a cylindrical combustion chamber having a rearwardly disposed axial opening and a forward end closed by a head closure member, a nozzle member coaxially aligned with said axial opening and defining a constricted axial exhaust passage, a propellant charge suspended within said chamber and comprising a plurality of charge units of substantially equal propellant mass arranged in a tandem manner and coaxial with said chamber, each of said charge units in turn comprising a plurality of propellant grains disposed in axially spaced relationship with one another and said casing, each of said grains fabricated from composite type propellant material comprising ammonium nitrate and a copolymer of butadiene and methylvinylpyridine, each grain being parallelepiped in configuration and having two oppositely disposed exposed burning surfaces, each grain being restricted on its two ends and two sides, each grain having at least one centrally-disposed, longitudinally-extending perforation, each grain having at least one support rod passing through said perforation with ends protruding therefrom, said exposed burning surfaces of said grain having an outwardly-protruding, longitudinally extending rib in alignment with said perforation, stationary perforate support plates defining each end of said charge unit, said support rod ends secured to said plates, the latter lying in a plane perpendicular to said longitudinal axis and being of a smaller diametrical dimension than said chamber, a lining of propellant material of the composite type bonded to the inside wall of said chamber by propellant mortar, the inner surface of said lining being exposed and the inner diametrical dimension of which is larger than said diametrical dimension of said plates whereby an annular passage exists therebetween, a plurality of charge unit support rails secured to the inner wall of said casing and substantially extending the length of said chamber, said rails protruding from said inner surface of said lining, means attached to the peripheries of said plates and adapted to articulate with said support rails whereby each of said charge units can be slidably loaded into said chamber, said support rails and said last-mentioned means adapted so as to transmit lateral forces operating upon said charge units during flight of said rocket motor directly to said casing, coupling means connecting axially aligned said support rods ends of adjacent charge units, a plurality of circumferentially-spaced bolts connected to that support plate adjacent said head closure member, said bolts extending through packing glands in said head closure member and secured to the latter, said bolts adapted to undergo only tensional stresses when said rocket motor is operated on by inertia forces whereby said forces are directed to said casing, and ignition means comprising a primary igniter centrally secured to the inside of said head closure member and a plurality of auxiliary igniters circumferentially-spaced and attached to said head closure member.

9. A rocket motor comprising a casing defining a combustion chamber having a longitudinal axis, said chamber having a rearwardly disposed axial opening; a detachable head closure member closing the forward end of said chamber; a nozzle member coaxially aligned with said axial opening; a propellant charge suspended within said chamber and comprising a plurality of stationary charge units arranged in a tandem manner and coaxial with said chamber; each of said charge units in turn comprising a plurality of propellant grains disposed in axially spaced relationship with one another and said casing, each of said grains fabricated from composite type propellant, each of said grains having oppositely disposed exposed burning surfaces; at least one support rod passing through each of said grains and protruding from the ends thereof; a plurality of stationary, circular, perforate, support plates defining each end of said charge unit, the said protruding ends of said support rods being secured to said plates, the latter lying in a plane perpendicular to said longitudinal axis and being of a smaller diametrical dimension than that of said chamber; a lining of propellant material of the composite type bonded to the inner wall of said chamber, the inner surface of said lining being exposed to serve as a burning surface; a plurality of charge unit support rails secured to the inner wall of said casing and substantially extending the length of said chamber, means attached to the peripheries of said plates and adapted to articulate with said support rails so as to permit lateral forces operating upon said charge units during operation of said rocket motor to be transmitted to said casing, said plate lying adjacent said head closure member being secured thereto so as to permit inertia forces operating upon said charge units to be transmitted to said casing; and ignition means disposed within said chamber and secured to said head closure member.

References Cited in the file of this patent

UNITED STATES PATENTS

| | | |
|---|---|---|
| 2,405,415 | Eksergian | Aug. 6, 1946 |
| 2,440,271 | Hickman | Apr. 27, 1948 |
| 2,446,560 | Skinner | Aug. 10, 1948 |
| 2,661,595 | Kuller | Dec. 8, 1953 |
| 2,684,629 | Nordfors | July 27, 1954 |